(12) United States Patent
Zhang

(10) Patent No.: US 8,859,691 B2
(45) Date of Patent: Oct. 14, 2014

(54) LOW TEMPERATURE THERMOPLASTIC MATERIAL AND PREPARING METHOD THEREOF

(75) Inventor: Zhongqun Zhang, Guangdong (CN)

(73) Assignee: Klarity Medical & Equipment (GZ) Co., Ltd. (CN)

( * ) Notice: Subject to any disclaimer, the term of this patent is extended or adjusted under 35 U.S.C. 154(b) by 0 days.

(21) Appl. No.: 13/511,284

(22) PCT Filed: Jan. 9, 2010

(86) PCT No.: PCT/CN2010/070102
§ 371 (c)(1),
(2), (4) Date: May 22, 2012

(87) PCT Pub. No.: WO2011/082547
PCT Pub. Date: Jul. 14, 2011

(65) Prior Publication Data
US 2012/0271007 A1   Oct. 25, 2012

(30) Foreign Application Priority Data

Jan. 9, 2010   (WO) ................ PCT/CN2010/070102

(51) Int. Cl.
C08L 67/04 (2006.01)
B29C 35/08 (2006.01)
C08F 283/00 (2006.01)
C08L 75/04 (2006.01)

(52) U.S. Cl.
CPC ............ C08L 67/04 (2013.01); C08F 283/006 (2013.01); C08L 75/04 (2013.01)
USPC ............................. 525/418; 264/494; 522/109

(58) Field of Classification Search
USPC ............ 525/418; 264/494; 522/109, 134–147
See application file for complete search history.

(56) References Cited

U.S. PATENT DOCUMENTS

| 4,316,457 A | 2/1982 | Liegeois |
| 4,473,671 A | 9/1984 | Green |
| 4,483,333 A * | 11/1984 | Wartman ........................ 602/7 |
| 4,762,884 A * | 8/1988 | Goyert et al. .................. 525/28 |
| 4,784,123 A * | 11/1988 | Robeson ........................ 602/8 |
| 5,151,315 A * | 9/1992 | Ponnet ........................ 428/212 |
| 5,540,876 A | 7/1996 | Larson et al. |
| 2002/0065373 A1 * | 5/2002 | Krishnan .................... 525/455 |

FOREIGN PATENT DOCUMENTS

| CN | 1120808 A | 4/1996 |
| CN | 1229690 A | 9/1999 |
| CN | 1408766 A | 4/2003 |
| CN | 101062977 A | 10/2007 |
| CN | 101104700 A | 1/2008 |
| JP | 2004-231910 A | 8/2004 |
| WO | 0112896 A1 | 2/2001 |

OTHER PUBLICATIONS

Pearlbond 122 datasheet (Jan. 2008).*
International Search Report for International Application No. PCT/CN2010/070102, mailed Oct. 28, 2012, with English translation.
Notification of the First Office Action for Chinese Application No. 200910192282.9, date of notification Dec. 6, 2010, with English translation.
Extended European Search Report for Application No. 10841891.4; Date of Mailing: Oct. 2, 2013.

* cited by examiner

Primary Examiner — Randy Gulakowski
Assistant Examiner — Christopher M Rodd
(74) Attorney, Agent, or Firm — Cantor Colburn LLP

(57) ABSTRACT

A low temperature thermoplastic material is provided. The components include in weight parts: polyurethane with a melting point of 50-70° C. 90-10 parts, poly(ε-caprolactone) 0-90 parts and cross linking co-agent 0.1-6 parts. Compared with the prior poly(ε-caprolactone) low temperature thermoplastic material, the present low temperature thermoplastic material has a smaller shrinking force and a better fastening intensity, is more comfortable and can be stretched more uniformly after molding. Therefore, the material is suitable for hospital and other radiotherapy institution and can be used compatibly with three-dimensional conformal radiotherapy equipments in tumor surgery.

7 Claims, No Drawings

LOW TEMPERATURE THERMOPLASTIC MATERIAL AND PREPARING METHOD THEREOF

CROSS REFERENCE TO RELATED APPLICATIONS

This is a U.S. national stage of application No. PCT/CN2010/070102, filed on 9 Jan. 2010, the disclosure of which is also incorporated herein by reference.

FIELD OF THE INVENTION

The invention relates to a low temperature thermoplastic material, and in particular to a medical low temperature thermoplastic material and the preparing method thereof.

BACKGROUND OF THE INVENTION

Conventional low temperature thermoplastic materials, which are made of poly($\epsilon$-caprolactone) as the main constituent and added additives, are characterized in that they can be softened at relatively lower temperature (about 65° C.) and molded into any shapes, while having the physical properties of polyolefins at ambient temperature. Such characteristics enable them to be used in accurate locating when treating a tumor patient by radiotherapy, or fabricating custom-made rehabilitation braces for the patients who need a rehabilitation therapy. Currently, the low temperature thermoplastic materials have been widely used in radiotherapic locating, surgical bone fixing, and the fabricating of orthopedic braces and rehabilitation braces, etc.

Although the currently used poly($\epsilon$-caprolactone) low temperature thermoplastic product can be conveniently molded, they have relatively large contraction force. At present, a composition consisting of polycaprolactone and carbon fiber for use in medical application which can reduce the contraction force has been proposed, however, in spite of the slightly reduced contraction force, they are relatively rigid, and a tumor patient would feel uncomfortable when it is stretched in the body of the tumor patient.

SUMMARY OF THE INVENTION

In order to overcome the disadvantages present in the prior art, the present invention provides a low temperature thermoplastic material having reduced contraction force and comfortable stretching.

Another object of the invention is to provide a method for preparing the above low temperature thermoplastic material.

The technical solution of the invention for solving the technical problems thereof comprises: a low temperature thermoplastic material, comprising in weight parts: 90-10 parts of polyurethane having a melting point of 50-70° C., 0-90 parts of polycaprolactone and 0.1-6 parts of crosslinking co-agent.

The method for preparing the above low temperature thermoplastic material comprises the steps of:
1) weighing raw materials according to the above weight ratio;
2) mixing and homogenizing all the raw materials by stirring;
3) heating the resultant mixture to a molten state, followed by sheet forming; and
4) perforating the sheets as desired, and then performing irradiation by an irradiation dose of 3-30 KGy.

The beneficial effects of the invention comprise: the low temperature thermoplastic material prepared according to the present invention, as shown in experiments, has less contraction force, better comfortable feeling, more uniform stretching and better fixation strength than conventional polycaprolactone low temperature thermoplastic products after being formed, and thus is more applicable for combined use with three-dimensional conformal radiotherapy apparatus in tumor surgery in a hospital or other radiotherapy institutions.

DETAILED DESCRIPTION OF THE PREFERRED EMBODIMENTS

A low temperature thermoplastic material comprises in weight parts: 90-10 parts of polyurethane having a melting point of 50-70° C.; 0-90 parts of polycaprolactone; and 0.1-6 parts of crosslinking co-agent. A preferred weight ratio comprises: 75-50 parts of polyurethane having a melting point of 50-65° C.; 25-50 parts of polycaprolactone; and 0.3-2 parts of crosslinking co-agent.

The crosslinking co-agents used in the material are monofunctional, bifunctional or multi-functional isooctyl acrylate, 1,6-hexanediol diacrylate, neopentyl glycol diacrylate, triallyl isocyanurate, trihydroxymethyl propane triacrylate, pentaerythritol triacrylate, dipentaerythritol hexaacrylate, and the like.

The method for preparing the above low temperature thermoplastic material comprises the steps of:
1) weighing raw materials according to the above weight ratio;
2) mixing and homogenizing all the raw materials by stirring;
3) heating the resultant mixture to a molten state at a temperature of 65-160° C., followed by sheet forming; and
4) perforating the resultant sheets as desired, and then performing irradiation by an irradiation dose of 3-30Kgy, preferably of 5-20 KGy, where the irradiation ray source is high energy electron accelerator, cobalt source, X-ray source or ultraviolet ray source, preferably the high energy electron accelerator and the cobalt source.

For a better understanding of the present invention, the invention will be described below in detail in combination with specific examples of the invention.

Example 1

10 kg polyurethane having a melting point of 50-70° C., 90 kg polycaprolactone, and 0.3 kg isooctyl acrylate were weighed and mixed uniformly, granulated with a twin screw extruder, and extruded or injected into sheets. Then, the sheets were perforated as desired to form perforated plates having various specifications, and finally irradiated by a cobalt source by a dose of 12 KGy for crosslinking. In this way, a low temperature thermoplastic product having reduced constriction force and comfortable stretching were manufactured.

Example 2

50 kg polyurethane having a melting point of 50-70° C., 50 kg polycaprolactone, and 0.5 kg trihydroxymethyl propane triacrylate were weighed and mixed uniformly, granulated by a twin screw extruder, and extruded or injected into sheets. Then, the sheets were perforated as desired to form perforated plates having various specifications, and finally irradiated by an electronic accelerator in a dose of 8 KGy for crosslinking.

In this way, a low temperature thermoplastic product with reduced constriction force and comfortable stretching were manufactured.

Example 3

90 kg polyurethane having a melting point of 50-70° C., 10 kg polycaprolactone, 0.5 kg triallyl isocyanurate were weighed and mixed uniformly, and extruded by an extruder into sheets. The sheets were then perforated as desired to form perforated plates having various specifications, and finally irradiated by cobalt-60 in a dose of 6 KGy for crosslinking In this way, a low temperature thermoplastic product with reduced constriction force and comfortable stretching were manufactured.

The low temperature thermoplastic materials prepared according to the present invention, as shown in experiments, have less contraction force, better comfortable feeling, more uniform stretching and better fixation strength than conventional polycaprolactone low temperature thermoplastic products, and thus is more applicable for combined use with three-dimensional conformal radiotherapy apparatus in tumor surgery in a hospital or other radiotherapy institutions, for example, for making the face mask and body mask used in radiotherapy site during the radiotherapy of a cancer patient.

The device for testing the contraction force of the sheet of a face mask: a pressure sensor connected to a computer (loaded with dedicated softwares) was placed below the head of a plaster model; and the heated sheet was stretched down the face of the plaster model, and then fixed on the base which is not connected to the pressure sensor. At the same time, timing and recording started. In this way, the computer recorded the contraction force of the mask sheet. The test was preformed at a room temperature of 24° C. with the temperature of heating water being 70° C. Using the contraction force measured over 24 hours as a standard, we tested the contraction forces of each of 5 sheets of the face mask sheets made of the material of the present invention and polycaprolactone-type low temperature thermoplastic material having 2.4 mm thickness and 36% mesh void rate, and the tested data is shown in the table below:

| material | testing results of contraction force (N) | | | | | average value |
|---|---|---|---|---|---|---|
| polycaprolactone | 52.66 | 60.60 | 44.56 | 52.77 | 50.88 | 52.17 |
| material of the present invention | 26.00 | 26.37 | 37.49 | 35.53 | 34.68 | 32.01 |

It can be seen from the above table that the contraction force of the material of the present invention is reduced by 38.64% in comparison with that of the polycaprolactone-type material, which, in turn, provides a patient with comfortable feeling. Besides, due to the reduced contraction force, the mesh formed during stretching will be more uniform, and thus a higher fixation strength can be achieved.

What is claimed is:

1. A low temperature thermoplastic material, characterized in that it is formed through a method which comprising the steps of:
   1) weighing 90-10 parts of polyurethane having a melting point of 50-70° C., 10-90 parts of polycaprolactone and 0.1-2 parts of crosslinking co-agent as raw materials;
   2) mixing and homogenizing all the raw materials by stirring;
   3) heating the mixture to a molten state, followed by sheet forming; and
   4) performing irradiation by an irradiation dose of 3-30 Kgy.

2. The low temperature thermoplastic material according to claim 1, characterized in the raw materials comprising in weight parts:
   75-50 parts of polyurethane having a melting point of 50-65° C.;
   25-50 parts of polycaprolactone; and
   0.3-2 parts of crosslinking co-agent.

3. The low temperature thermoplastic material according to claim 1, characterized in that the crosslinking co-agent is monofunctional, bifunctional or multi-functional isooctyl acrylate, 1,6-hexanediol diacrylate, neopentyl glycol diacrylate, triallyl isocyanurate, trihydroxymethyl propane triacrylate, pentaerythritol triacrylate or dipentaerythritol hexaacrylate.

4. The low temperature thermoplastic material according to claim 1, characterized in that: the heating temperature in steps 3) is 65-160° C.

5. The low temperature thermoplastic material according to claim 1, characterized in that: the irradiation ray source in step 4) is high energy electron accelerator, cobalt source, X-ray source or ultraviolet ray source.

6. The low temperature thermoplastic material according to claim 1, characterized in that: the irradiation dose in step 4) is 5-20 Kgy.

7. The low temperature thermoplastic material according to claim 1, characterized in that: the method further comprises perforating the sheet before the step of performing irradiation.

* * * * *